United States Patent
Butcher et al.

(10) Patent No.: US 11,011,876 B2
(45) Date of Patent: May 18, 2021

(54) SYSTEM AND METHOD FOR REMOTE MANAGEMENT OF NETWORK INTERFACE PERIPHERALS

(71) Applicant: DELL PRODUCTS, LP, Round Rock, TX (US)

(72) Inventors: Andrew Butcher, Cedar Park, TX (US); Timothy M. Lambert, Austin, TX (US); Lee Eric Ballard, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 158 days.

(21) Appl. No.: 16/231,830

(22) Filed: Dec. 24, 2018

(65) Prior Publication Data

US 2020/0203898 A1    Jun. 25, 2020

(51) Int. Cl.
*H01R 13/703*  (2006.01)
*H04L 12/935*  (2013.01)
*H04L 12/933*  (2013.01)

(52) U.S. Cl.
CPC ......... *H01R 13/7039* (2013.01); *H04L 49/15* (2013.01); *H04L 49/30* (2013.01); *H01R 2201/04* (2013.01)

(58) Field of Classification Search
CPC . H01R 13/7039; H01R 2201/04; H04L 49/30; H04L 49/15; G06F 13/00; G06F 13/385
See application file for complete search history.

(56) References Cited

U.S. PATENT DOCUMENTS

| | | | | |
|---|---|---|---|---|
| 6,151,653 A | * | 11/2000 | Lin | G06F 13/4009 710/305 |
| 7,778,244 B1 | * | 8/2010 | Sheikh | G06F 3/0661 370/363 |
| 7,802,044 B2 | * | 9/2010 | Chien | G06F 13/385 710/305 |
| 10,242,176 B1 | * | 3/2019 | Sathyanarayana | G06F 13/42 |
| 2003/0200359 A1 | * | 10/2003 | Fernald | G06F 13/4291 710/5 |
| 2005/0005076 A1 | * | 1/2005 | Lasser | G06F 8/60 711/154 |
| 2006/0184536 A1 | * | 8/2006 | Jreij | H04L 45/00 |
| 2015/0043593 A1 | * | 2/2015 | Snowdon | H04L 49/30 370/419 |
| 2016/0011887 A1 | * | 1/2016 | Chung | G06F 1/266 713/2 |
| 2016/0080210 A1 | * | 3/2016 | Lai | G06F 13/382 709/224 |

(Continued)

OTHER PUBLICATIONS

Cisco Smart SFP Network Interface Device, 2015, accessed Aug. 14, 2020.

(Continued)

*Primary Examiner* — Farley Abad
(74) *Attorney, Agent, or Firm* — Larson Newman, LLP

(57) ABSTRACT

Remote management of network interface peripheral cards uses physical pin reassignment and a dedicated management network. One or more physical pins in a connector may be dynamically redefined from an interface protocol to a different interface protocol. The dynamic redefinition allows existing input/output signals to be routed to the pins to provide remote management features.

20 Claims, 5 Drawing Sheets

(56) References Cited

U.S. PATENT DOCUMENTS

2018/0032463 A1* 2/2018 Olarig .................. G06F 13/4282
2019/0095377 A1* 3/2019 Brown ................ G06F 13/4286

OTHER PUBLICATIONS

Doyle, Lee, An introduction to smart NICs and their benefits, https://searchnetworking.techtarget.com/tip/An-introduction-to-smart-NICs-and-their-benefits, 2019, 6 pages, accessed Aug. 14, 2020.
Schweitzer, Scott, https://technologyevangelist.co/, What's a Smart NIC?, Jul. 17, 2017, https://technologyevangelist.co/2017/07/17/whats-a-smart-nic/), 5 pages, accessed Aug. 14, 2020.

* cited by examiner

SYSTEM AND METHOD FOR REMOTE MANAGEMENT OF NETWORK INTERFACE PERIPHERALS

FIELD OF THE DISCLOSURE

The present disclosure generally relates to information handling systems, and more particularly relates to network interfaces to communications networks.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

Remote management of network interface peripheral cards uses physical pin reassignment and a dedicated management network. One or more physical pins in a connector may be dynamically redefined from an interface protocol to a different interface protocol. The dynamic redefinition allows existing input/output signals to be routed to the pins to provide remote management features.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
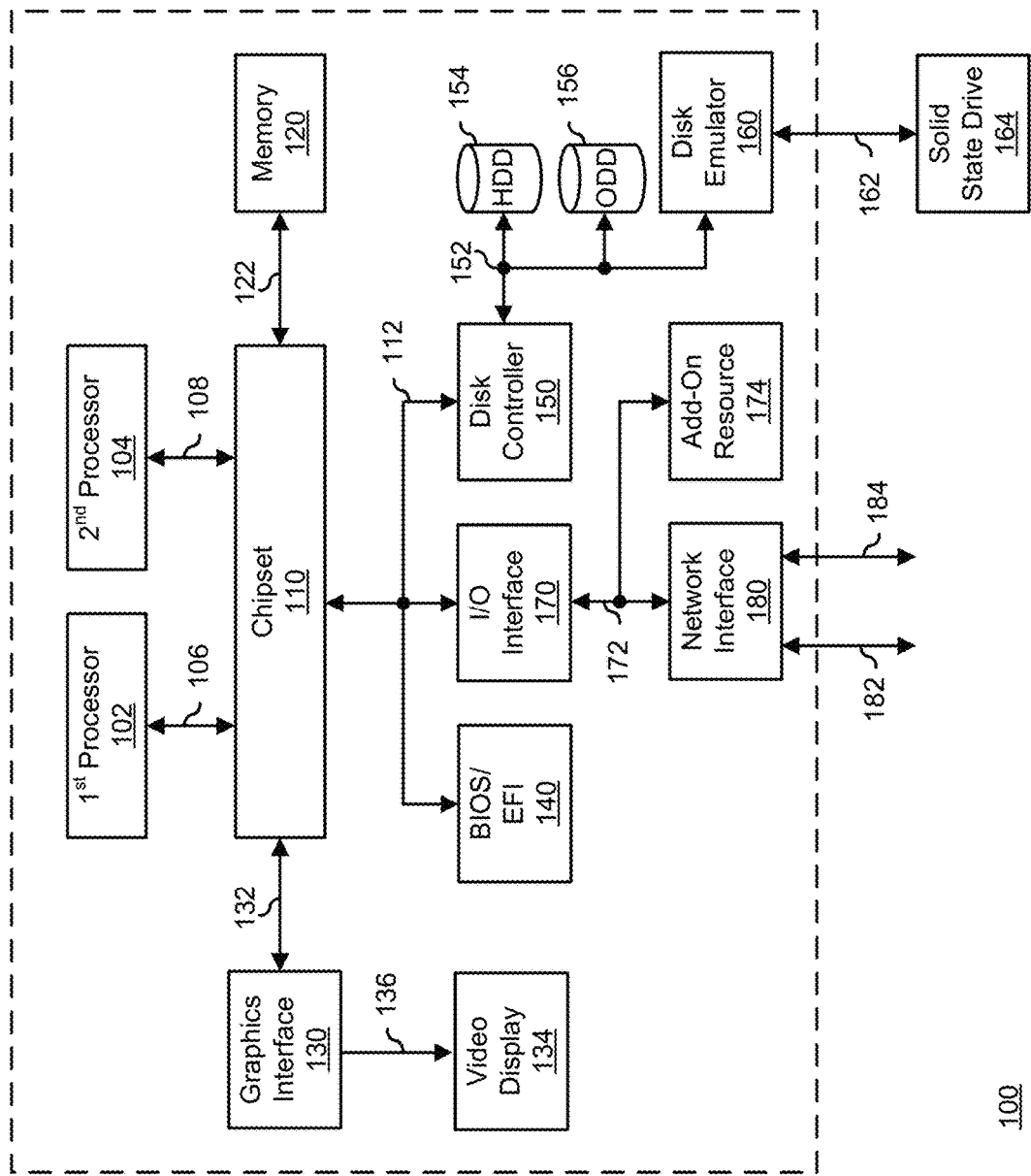
FIG. 1 is a block diagram illustrating an information handling system according to an embodiment of the present disclosure.

FIG. 1 illustrates a generalized embodiment of information handling system 100, according to exemplary embodiments. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes processors 102 and 104, a chipset 110, a memory 120, a graphics interface 130, include a basic input and output system/extensible firmware interface (BIOS/EFI) module 140, a disk controller 150, a disk emulator 160, an input/output (I/O) interface 170, and a network interface 180. Processor 102 is connected to chipset 110 via processor interface 106, and processor 104 is connected to chipset 110 via processor interface 108. Memory 120 is connected to chipset 110 via a memory bus 122. Graphics interface 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources.

Disk controller 150 includes a disk interface 152 that connects the disc controller 150 to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1394 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a peripheral card disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

Figure 2:
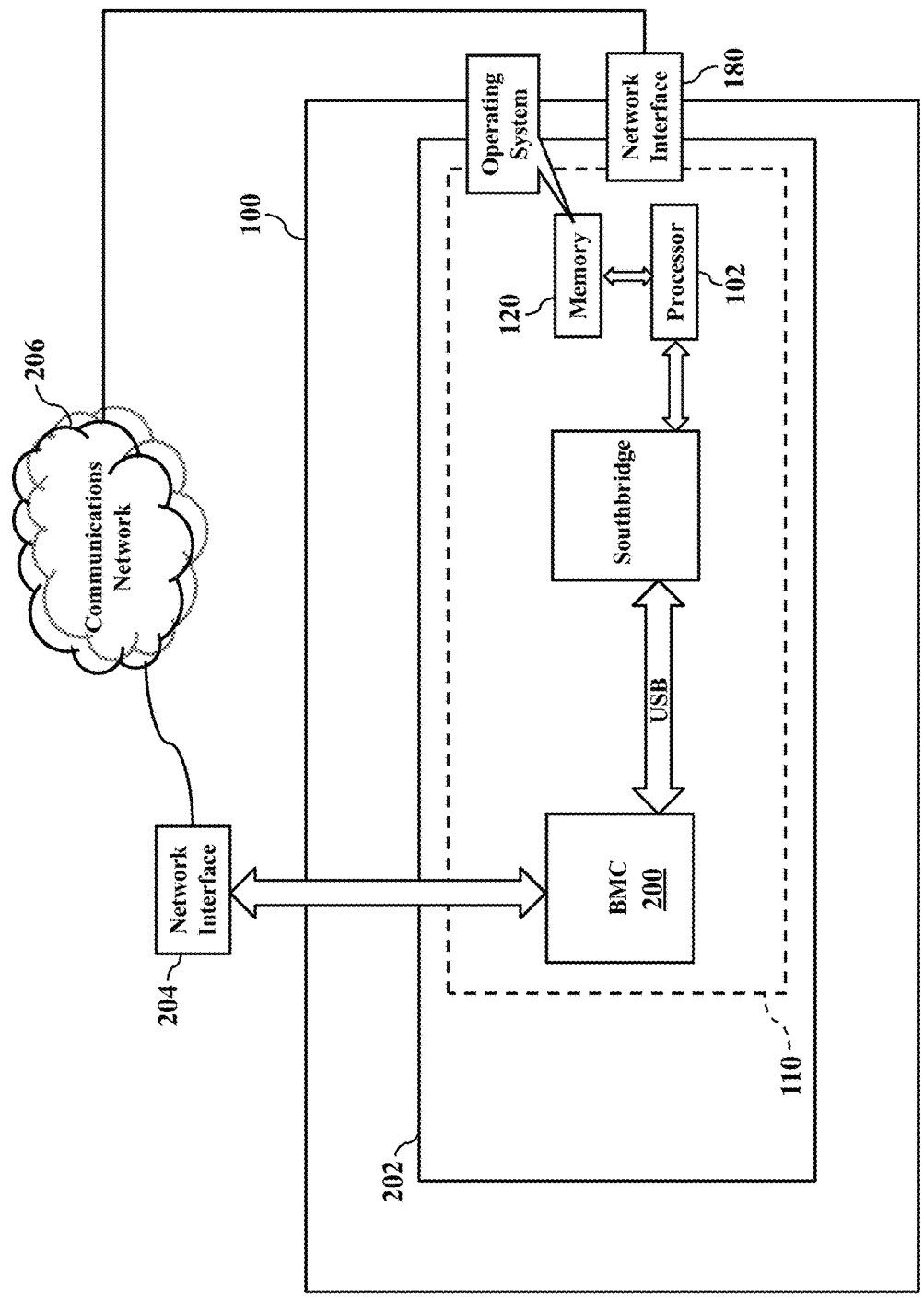
FIGS. 2-3 further illustrate the information handling system, according to exemplary embodiments.
Figure 3:
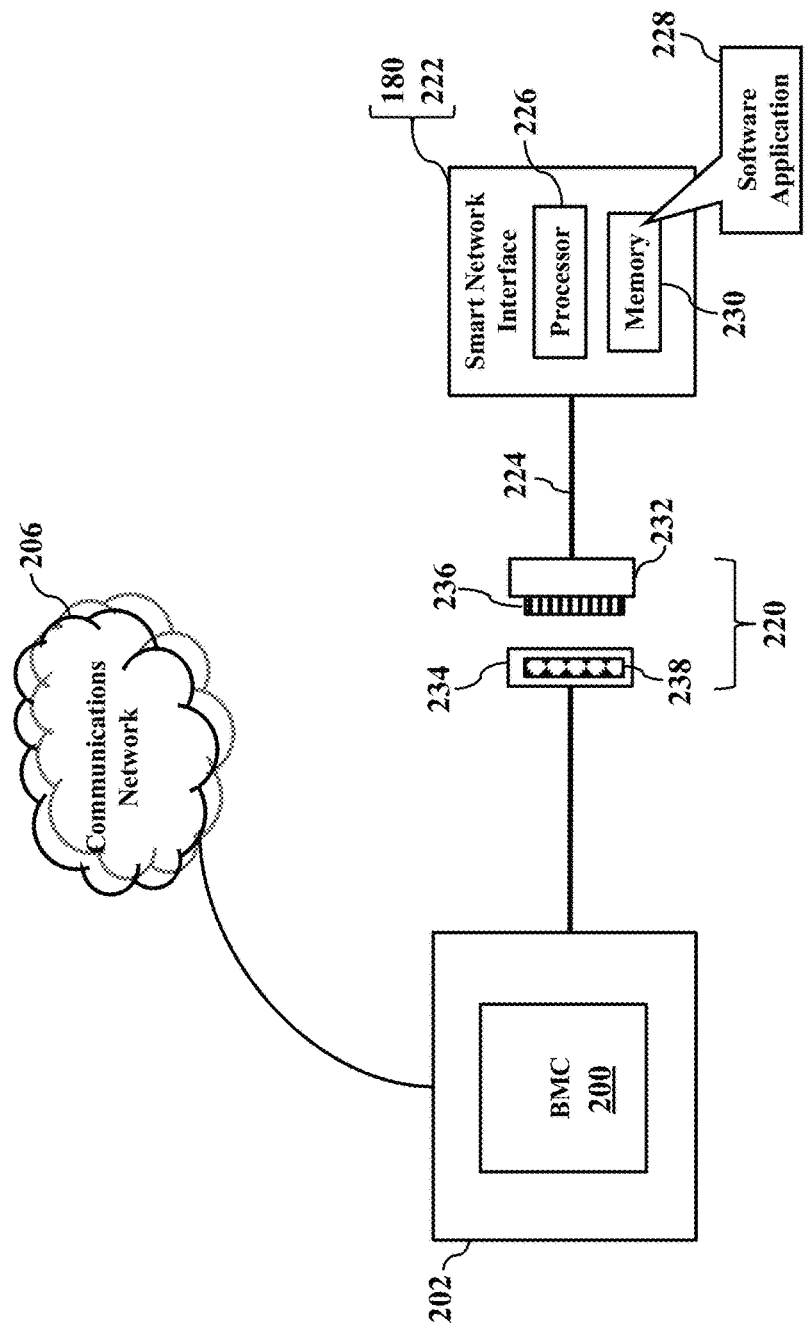

FIGS. 2-3 further illustrate the information handling system 100, according to exemplary embodiments. The information handling system 100 may include a baseboard management controller 200 that has its own management processor and memory device (not shown for simplicity) that interfaces with a motherboard or planar 202 to provide side-band and out-of-band remote management (perhaps according to the Intelligent Platform Management Interface specification). The baseboard management controller 200 has one or more physical communications links and interfaces to the motherboard 202, thus allowing the baseboard management controller 200 to process messages according to the IPMI specification. The baseboard management controller 200 may thus monitor and remotely report the functions and performance of the information handling system 100 via a separate network interface 204 to a communications network 206. The baseboard management controller 200 and the IPMI specification are generally well known and thus need not be explained in detail.

FIG. 3 illustrates a physical connection 220 to the network interface 180. The network interface 180 is illustrated as a peripheral card 222 that mechanically connects to the baseboard management controller 200 via a peripheral component interface express 224. The network interface 180 may be a smart network interface having its own dedicated processor 226 that executes a software application 228 locally stored in a solid-state memory device 230. The processor 226 may be a multi-core microprocessor, application specific integrated circuit, or field programmable gate array. Regardless, as the reader may understand, the physical connection 220 has a male plug 232 that inserts into a female socket 234. The male plug 232 has outwardly extending conductive pins 236 that insert into corresponding female conductive pin receptacles 238 in a male/female mating relationship. Electrical signals and/or electrical power may then be communicated or conveyed via the physical connection 220 between the network interface 180 and the baseboard management controller 200. The smart network interface 180 may thus cooperate with the baseboard management controller 200 to at least temporarily assign and/or dynamically configure the conductive pins 236 and/or the female conductive pin receptacles 238 to provide remote functional management.

The smart network interface 180 provides efficient and low-latency network functions. The smart network interface 180 may employ custom processing cores for packet classification and/or routing, customizable ARM processors, and any number of FPGA plus NIC architectures. The management of the smart network interface 180 may use capabilities similar to what the standard remote management suite offers. For example, in contrast to a standard NIC, the smart network interface 180 typically runs LINUX and has a console interface (which is not extractable through the standard PCIe connector). Also, the software application 228 may include a SmartNIC bootloader (preboot environment) having a serial console interface. Another useful feature is with virtual media, the ability to mount a storage device from a remote location for performing updates or diagnostics. At best, these capabilities only exist today for a local user who is able to gain access directly to the cards by opening the server and plugging in cables. To make the cards more serviceable, these routine features are ideally be available to a remote administrator. As many customers prefer, the features should be available over a dedicated management network rather than the same in-band network ports servicing the regular server workloads. (Also, an in-band interface would be unworkable in some cases because it requires the OS to be running on the SmartNIC 180, the VLAN/IP to be configured, and user accounts to be set up.) Exemplary embodiments thus provide these management functions remotely via the communications network 206, as well as via the baseboard management controller 200 for local system management access via alternate interfaces such as iDRAC Direct or QuickSync wireless.

Figure 4:
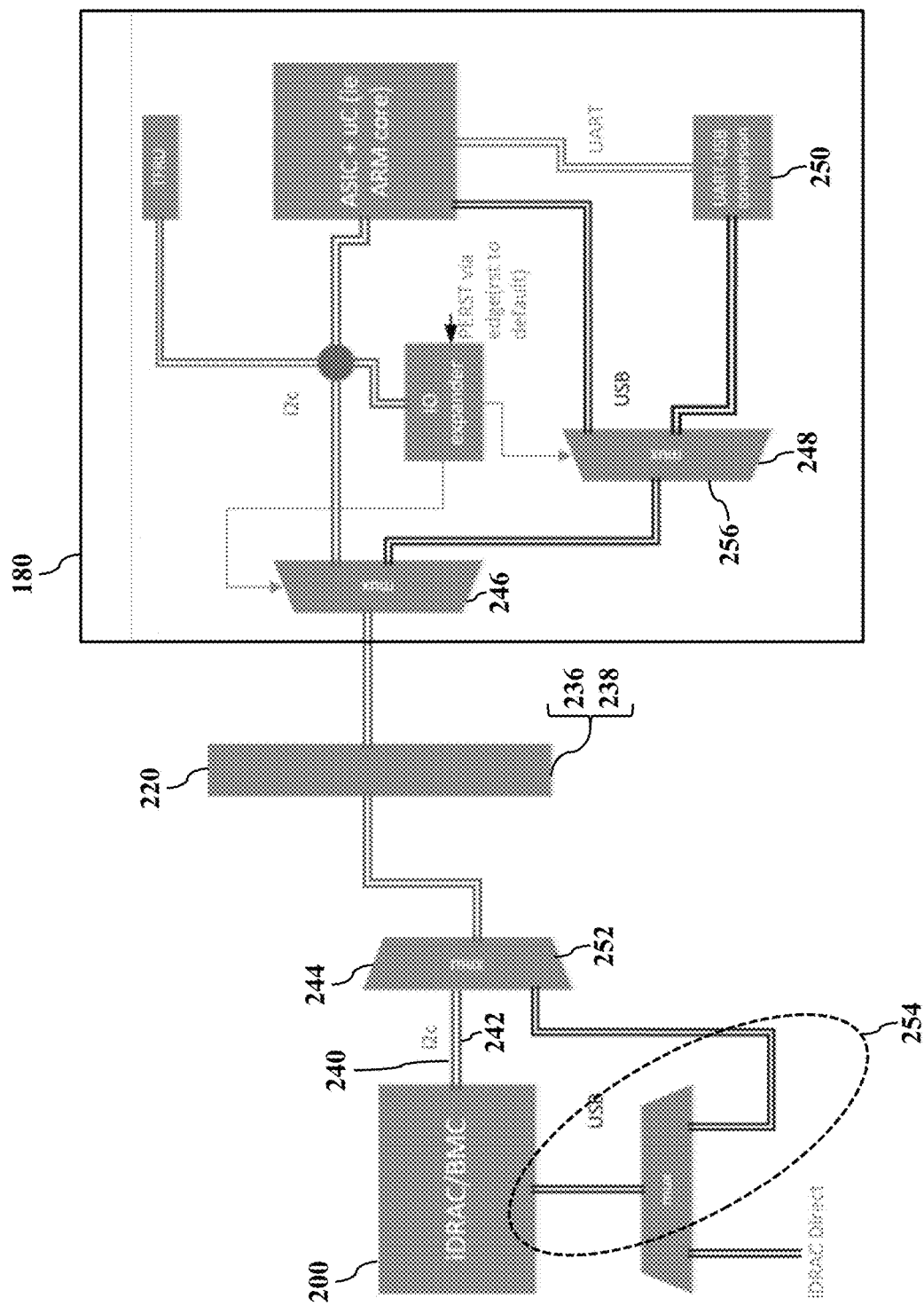
FIG. 4 illustrates protocol conversion componentry, according to exemplary embodiments.
Figure 5:
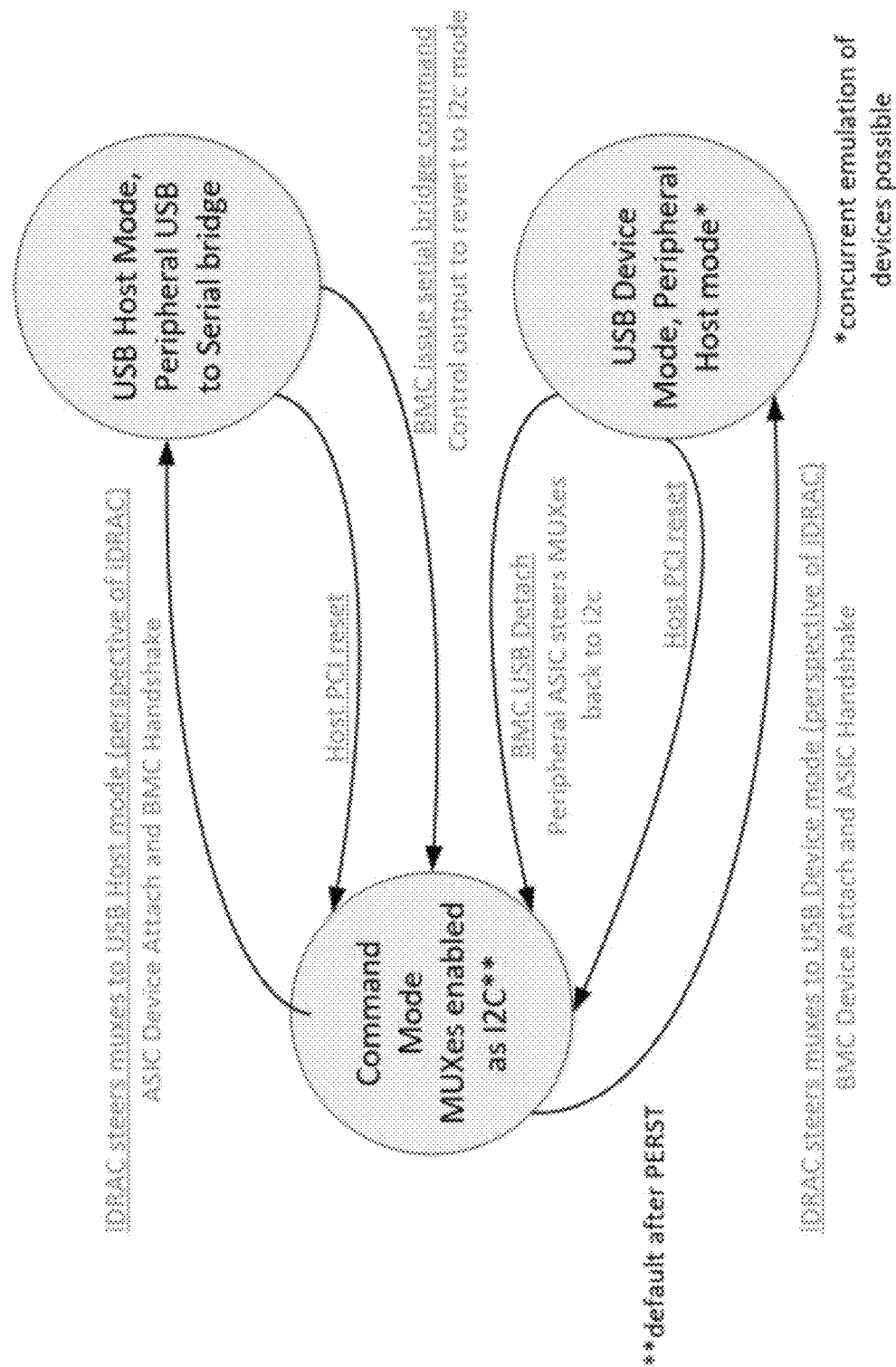
FIG. 5 illustrates a state diagram, according to exemplary embodiments.

FIGS. 4-5 illustrate a dynamic definition of the physical connection 220, according to exemplary embodiments. FIG. 4 illustrates device componentry, while FIG. 5 illustrates a state diagram for an implementation on the BMC side of the interface. The input/output functions assigned to the conductive pins 236 and/or to the female conductive pin receptacles 238 may be dynamically redefined or configured to provide remote functional management. For example, the two (2) conductive pins 236 reserved for SMBus clock and SMBus data (e.g., Pin #5 and Pin #6 as defined by the PCIe high-speed serial computer expansion bus standard) may be used as a differential pair for uniform serial bus (USB) communications. On the planar side, the switching may be internal to the baseboard management controller 200 (or other system on chip) discretely on the motherboard 202 (illustrated in FIGS. 2-3). With this capability, existing I/O on the smart network interface 180 (e.g., from the processor 226) may be routed to the two (2) conductive pins 236, and remote management features can be provided by the baseboard management controller 200 with minimal software changes.

In another embodiment, a differential pair can be repurposed to implement IEEE 802.3cg, a single-pair 10 Mb/s peripheral interface being defined and promoted as a next generation interface as an evolution of I2C and CAN bus. As this standard is slowly implemented, the transition will not occur overnight, and PCIe connectors will continue to be able to support this method of altering the interface functions on the fly between I2C, USB and others such as I3C.

Exemplary embodiments may commend the peripheral how to define the protocol for the pins 236 in the physical connection 220. For example, an I2C command 240 is sent via an I2C bus 242 to a bus expander that instructs or commands a multiplexer 244 to switch, thus activating the pins 236 of a different interface within the smart network interface 180 (e.g., multiplexer 246), while performing the same internally to the baseboard management controller 200 or via the motherboard circuit control. Different methods are envisioned if the initial state of the interface is not I2C. An in-band command could be used to select the interface type, and this command would be interpreted by the ASIC which would in turn use either I2C or GPIO to steer or command the multiplexers. The in-band commands could be VDMs (vendor defined messages) over the PCIe interface (BMC to adapter host facing interface), and a future version of the DMTF NC-SI specification may include standard commands for pin function definition.

Remote management of the smart network interface 180 may be performed. Exemplary embodiments provide a remote console serial interface over the dedicate management network. For example, the baseboard management controller 200 issues the I2C command 240 to steer one or more multiplexers (e.g., 246 and/or 248) to route the ASICs UART interface (through a USB converter 250) to the peripheral pins 236. The baseboard management controller 200 steers or commands its own multiplexer 244 to attach its USB port pins 252 to the PCIe connector interface (e.g., the female conductive pin receptacles 238 in the physical connection 220). The baseboard management controller 200 programs its USB interface 254 to operate in host mode and loads a driver as the USB-UART converter 250 is attached.

4. Optionally, the baseboard management controller 200 proxies the transmitted and receive data to a serial port for a local user (real serial port, iDRAC Direct, QuickSync wireless, etc.). Optionally, the baseboard management controller 200 provides the data for a Serial over LAN user on the remote network. The baseboard management controller 200 echoes the data in a console mode for a remote SSH user. Remote management commands may thus be received by the baseboard management controller 200 (via the network interface 204 to the communications network 206) and sent or passed to the smart network interface 180 via the PCIe connector interface.

Exemplary embodiments may also provide a virtual media function for a remote user or the local OS via BMC proxy. For example, the baseboard management controller 200 steers the multiplexers (e.g., 244, 246 and/or 248) and programs USB port pins 252 for device mode. The smart network interface 180 receives an out-of-band command from the baseboard management controller 200 to perform a USB device attach. The smart network interface 180 uses its USB host port 256 to enumerate an attached virtual mass storage device. Optionally, the baseboard management controller 200 implements a device to implementing a serial port function, and the serial console could be accomplished concurrently with virtual media. The baseboard management controller 200 has hubs internally and the ability to emulate mixed class composite and compound USB devices.

Exemplary embodiments may use the I2C command 240 to change the pin usage and protocol on a PCIe peripheral connector pins. The pins 236 may be multipurposed for USB or for IEEE 802.3cg or other protocols (such as I3C). Exemplary embodiments implement the most value added management features. Concurrent serial and USB emulation between a BMC and a multiplicity of add-in cards, versus focusing remote management on only one slot at a time. Exemplary embodiments may easily extend to other subsystems, such as PCIe switch boards, as new PCIe switches have internal processors with a serial console.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a processor or other such device, or software capable of operating a relevant environment of the information handling system. The device or module can also include a combination of the foregoing examples of hardware or software. An information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A peripheral card, comprising:
a hardware processor; and
a memory device accessible to the hardware processor, the memory device storing instructions that when executed cause the hardware processor to perform operations, the operations including:
  receiving a command sent via an inter-integrated circuit from a baseboard management controller;
  in response to the command sent via the inter-integrated circuit from the baseboard management controller:
    dynamically assigning a physical pin in a physical connector from a peripheral component interface express to a uniform serial bus interface without reassigning the remaining physical pins in the physical connector from the peripheral component interface express to the uniform serial bus interface; and
    routing a universal asynchronous receiver/transmitter interface through a uniform serial bus converter to the dynamically assigned physical pin; and
  receiving a remote management command via the peripheral component interface express from the baseboard management controller.

2. The peripheral card of claim 1, wherein the operations further comprise commanding a multiplexer in response to the command sent via the inter-integrated circuit from the baseboard management controller.

3. The peripheral card of claim 1, wherein the operations further comprise configuring a clock pin from the peripheral component interface express to the uniform serial bus interface.

4. The peripheral card of claim 1, wherein the operations further comprise configuring a data pin from the peripheral component interface express to the uniform serial bus interface.

5. The peripheral card of claim 1, wherein the operations further comprise commanding a multiplexer to enter a uniform serial bus host mode.

6. The peripheral card of claim 1, wherein the operations further comprise performing a handshake communication between the peripheral card and the baseboard management controller.

7. The peripheral card of claim 1, wherein the operations further comprise resetting to a host mode of operation.

8. A method, comprising:
receiving, by a peripheral card, a command sent via an inter-integrated circuit from a baseboard management controller;
in response to the command sent via the inter-integrated circuit from the baseboard management controller;
  dynamically assigning, by the peripheral card, a physical pin in a physical connector from a peripheral component interface express to a uniform serial bus interface without reassigning the remaining physical pins in the physical connector from the peripheral component interface express to the uniform serial bus interface; and
  routing a universal asynchronous receiver/transmitter interface through a uniform serial bus converter to the dynamically assigned physical pin; and
receiving, by the peripheral card, a remote management command via the peripheral component interface express from the baseboard management controller.

9. The method of claim 8, further comprising commanding a multiplexer in response to the command sent via the inter-integrated circuit from the baseboard management controller.

10. The method of claim 8, further comprising configuring a clock pin from the peripheral component interface express to the uniform serial bus interface.

11. The method of claim 8, further comprising configuring a data pin from the peripheral component interface express to the uniform serial bus interface.

12. The method of claim 8, further comprising converting the peripheral component interface express to the uniform serial bus interface.

13. The method of claim 8, further comprising commanding a multiplexer to enter a uniform serial bus host mode.

14. The method of claim 13, further comprising performing a handshake communication between the peripheral card and the baseboard management controller.

15. The method of claim 8, further comprising resetting to a host mode of operation.

16. The method of claim 8, further comprising receiving an in-band command sent from the baseboard management controller.

17. A memory device storing instructions that when executed cause a hardware processor to perform operations, the operations comprising:
receiving a command sent via an inter-integrated circuit from a baseboard management controller;
in response to the command sent via the inter-integrated circuit from the baseboard management controller:
dynamically assigning a physical pin in a physical connector from a peripheral component interface express to a uniform serial bus interface without reassigning the remaining physical pins in the physical connector from the peripheral component interface express to the uniform serial bus interface; and
routing a universal asynchronous receiver/transmitter interface through a uniform serial bus converter to the dynamically assigned physical pin; and
receiving a remote management command via the peripheral component interface express from the baseboard management controller.

18. The memory device of claim 17, wherein the operations further comprise commanding a multiplexer in response to the command sent via the inter-integrated circuit from the baseboard management controller.

19. The memory device of claim 17, wherein the operations further comprise configuring a clock pin to switch from the peripheral component interface express to the uniform serial bus interface.

20. The memory device of claim 17, wherein the operations further comprise configuring a data pin to switch from the peripheral component interface express to the uniform serial bus interface.

* * * * *